April 11, 1944. H. C. CARPENTER 2,346,414
VEHICLE SEAT
Filed Nov. 9, 1940 2 Sheets-Sheet 1
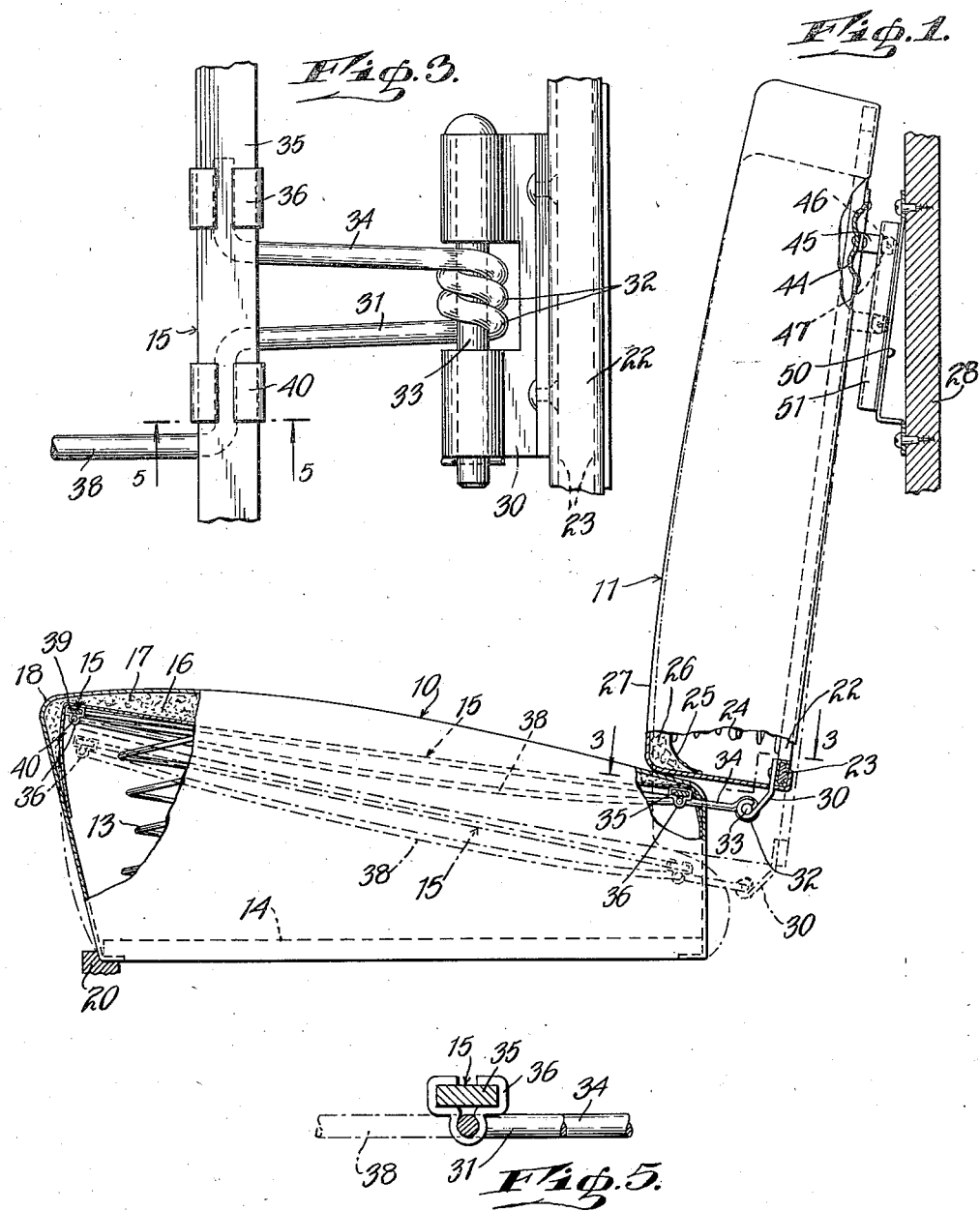
INVENTOR
HOMER C. CARPENTER
BY
ATTORNEY April 11, 1944.  H. C. CARPENTER  2,346,414
VEHICLE SEAT
Filed Nov. 9, 1940  2 Sheets-Sheet 2
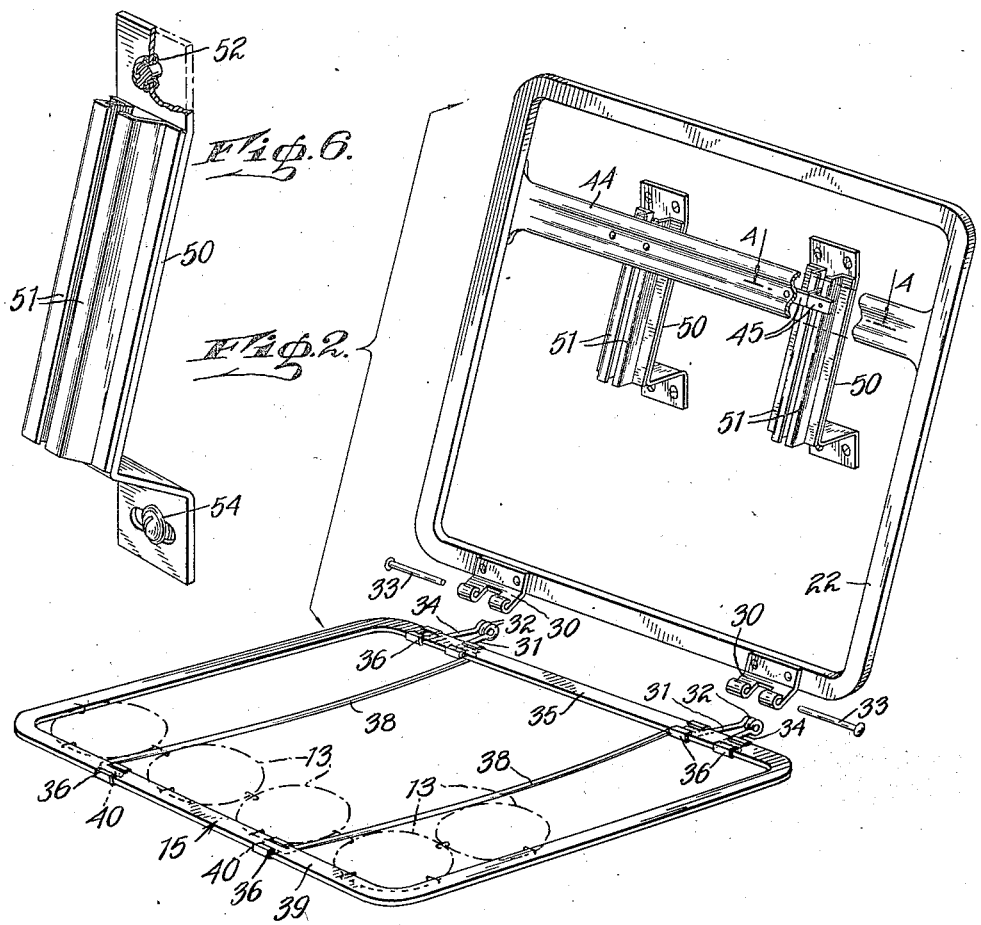
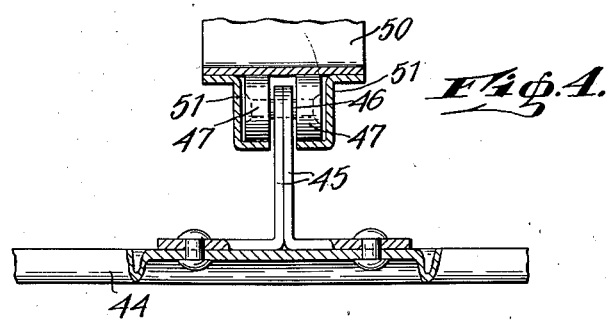
INVENTOR
HOMER C. CARPENTER
BY
ATTORNEY Patented Apr. 11, 1944

2,346,414

UNITED STATES PATENT OFFICE 2,346,414

VEHICLE SEAT

Homer C. Carpenter, Royal Oak, Mich., assignor to The Owen Silent Spring Company, Inc., Bridgeport, Conn., a corporation of Connecticut Application November 9, 1940, Serial No. 365,073

8 Claims. (Cl. 155—53)

This invention relates to improvements in cushion seats more particularly seats for vehicles.

Among the objects of this invention are improvements in the type of cushion known as a unison seat in which provision is made for the seat back to move up and down with the top or upper section of the seat cushion, and consist in the provision of improved means whereby the seat back is so supported as not to interfere with the free normal movements of the top or upper section of the seat cushion, and improved means whereby a hinged connection between light cushion frames or border wires is feasible, one element of the hinged construction including means for bracing the upper frame or border wire of the seat cushion and maintaining the proper relation between the top of the seat cushion and the bottom of the seat back.

Other objects of the invention will appear from the following description taken in connection with the drawings in which, Fig. 1 is a side elevational view of a unison cushion constructed in accordance with my invention showing parts broken away;

Fig. 2 is a perspective view of a seat back bottom or frame and a seat cushion upper frame and the pivot means for connecting the same.

Fig. 3 is a top plan view on the line 3—3 of Fig. 1;

Fig. 4 is a sectional view on the line 4—4 of Fig. 2;

Fig. 5 is a sectional view on the line 5—5 of Fig. 3; and

Fig. 6 shows a modified connection between the seat back guides and the seat back support.

The seat cushion is generally indicated at 10 and the seat back at 11. The seat cushion 10 may include an inner spring unit 13 constructed preferably of helical vertical springs as indicated and this unit may include a lower frame member or base 14 for supporting the springs and an upper rectangular frame or border wire 15 which may be of relatively thin strip material and of the usual construction surrounding the group of springs and suitably secured thereto in any well known manner. These springs are arranged in spaced longitudinal rows as indicated in Fig. 2 for purposes later referred to. A protecting cover 16 may be placed over the springs and upper frame member and may project downwardly toward the lower frame member or base. This cover supports padding material 17 and the entire cushion may be enclosed in an outer cover 18 which may be secured to the base 14 as indicated. The seat cushion construction so far described is old and well known. The seat cushion may be supported on a member 20 of any well known form.

The seat back 11 comprises a rectangular frame or base 22 which may also be constructed of relatively thin strip material and may be formed by folding a thin strip of material over tacking material 23 as indicated in Fig. 1. Supported on this frame by any suitable means is a spring cushion unit 24 of helical springs which may be enclosed by a spring cover 25 on which is supported padding material 26 enclosed by an outer cover 27 which may be secured to the tacking material 23 in any well known manner. A seat back support 28 may be fixedly or pivotally secured to the seat cushion supporting member 20 in any well known manner or the seat back support and seat cushion supporting member may be separately supported on the vehicle body.

For the purpose of causing the seat back to move with the upper section or top of the seat cushion, I provide an improved hinged connection between the frame or base 22 of the seat back and the upper frame 15 of the seat cushion. This includes hinge elements 30 secured in horizontally spaced relation to the lower element of the seat back frame 22 and hinge members 31 formed of relatively stiff but resilient wire coiled in several spaced convolutions to provide eyes 32 to receive pintles 33 passed through the eyes of hinge members 30. The eyes 32 may be slightly shorter than the distances between the eyes of the hinge element 30. The ends of the helical eyes are extended forwardly in the same direction, one end 34 of which terminates under the rear cross member 35 of the upper frame 15 of the seat cushion and is bent laterally into contact with the lower face of said member and clipped thereto by a clip 36 indicated in Fig. 5, the other end of which is similarly formed and clipped against the lower face of the rear cross member 35 and then is extended forwardly between adjacent rows of springs as indicated at 38 under the front cross member 39 of the upper frame 15 and bent laterally as at 40 and secured thereto by a clip 36. As is apparent from the disclosure in Fig. 1 the intermediate portion of the extension 38 of the hinge member 31 is offset or bent downwardly below the upper ends of the helical springs in the cushion seat so as not to interfere with slight local yielding of the springs of the cushion seat. The extensions 38 constitute brace members for the upper frame 15 and help to maintain the proper relation between the top of the seat cushion and the bottom of the seat back. If it were not for these braces, it would be possible to compress the central portion of the seat cushion two or more inches while at the same time compressing the upper frame not more than half an inch. By locating the braces directly under the passenger almost any up or down movement of the top of the central portion of the spring unit will result in substantially the same amount of movement of the upper frame and of the seat back frame 22. For this purpose the rows of helical springs may be spaced so that there will be no interference between the parts 38 and the helical springs. The extensions 38 may extend through the helical springs and for this purpose they are offset to pass between the upper and next adjacent convolutions of the springs as is apparent from Fig. 1.

In order to permit free movement of the seat back 11 with the upper frame 15 of the seat cushion and also in order that the cushioning movement of the seat cushion may not be affected by its connection with the seat back cushion and also that the seat back cushion may be prevented from tilting and folding forwardly down upon the seat cushion, the back cushion frame is provided with a transversely extending member 44 to which are secured roller brackets 45 in the ends of which are journaled shafts 46 supporting pairs of rollers 47. To provide a track for these rollers I provide a pair of inclined channel or roller guiding brackets comprising base plates 50 secured to the seat back support 28 by any well known means such as screws and in order to prevent the rollers from moving forwardly and for the purpose of preventing forward tilting of the seat back angularly formed members 51 arranged in opposed relation are secured to the plates 50 as by welding. The opposed flanges of these members constitute retaining tracks for the rollers. The construction is such that the rollers are confined in such a manner as to guide the adjacent portion of the seat back in the direction of the track or slot provided by these members as indicated in Fig. 4. The thickness of the brackets 45 is less than the distance between said opposed flanges so that the seat back cushion may move angularly with respect to a line normal to its plane and may also move laterally slightly. By using but one pair of rollers for each of the tracks, the seat back may pivot about the point of contact between such rollers and the plates 50 and members 51 which permits the lower end of the seat back to move in a horizontal plane forward or rearward to adjust itself to movements of the upper frame of the cushion seat. The freedom of movement of the bracket 45 in the slot between the flanges of the members 51 also permits sufficient rotation of the seat back about a horizontal axis to permit freedom of movement of the upper frame of the cushion seat, such as tilting movement about a line paralleling the extensions 38 of the brackets 31.

For the purpose of preventing any binding between the roller brackets and the edges of the slot defined by the angle members 51, I provide the upper end of the member 50 with a larger circular hole and equip it with an eyelet 52 and enlarge and transversely elongate the lower hole in the member 50 and equip it with an eyelet 54 so that the lower end of the member 50 may rock laterally about the upper attaching screw.

While for the purpose of disclosure I have illustrated and described a preferred embodiment of my invention, it is to be understood that I reserve the right to all such changes as fall within the principles of this invention and the scope of the appended claims.

I claim:

1. In a cushion construction comprising a seat cushion including cushioning means and an upper rectangular open frame supported by said cushioning means, a back support, and a seat back supported thereon for guided movement in a substantially vertical plane, said seat back having a back frame or base, means connecting the base of the seat back to the upper frame of the seat cushion for movement therewith, said means comprising hinge members, one of said hinge members being secured to said base of the seat back and the other hinge member being formed of a rod coiled intermediate of its ends to form a pintle receiving eye, one of said ends extending under the rear cross member of said upper frame and the other end extending under and spanning the rear and front cross members of said upper frame, and means securing said ends respectively to said rear and front cross members of said upper frame.

2. In a cushion construction comprising a seat cushion including cushioning means and an upper open rectangular frame supported by said cushioning means, a back support, and a seat back supported thereon for guided movement in a substantially vertically vertical plane, said seat back having a back frame or base, means connecting the base of the seat back to the upper frame of the seat cushion for movement therewith, said means comprising hinge members, one of said hinge members being secured to the base of said seat back and having spaced pintle receiving eyes and the other hinge member being formed of a rod coiled intermediate of its ends to form a pintle receiving eye of less length than the distance between the eyes of said first mentioned hinge member, one of said ends extending under the rear cross member of said upper frame and the other end extending under and spanning the rear and front cross members of said upper frame and means securing said ends respectively to said rear and front cross members of said upper frame.

3. In a cushion construction comprising a seat cushion including cushioning means and an upper open rectangular frame supported by said cushioning means, a back support, and a seat back cushion supported thereon for guided movement in a substantially vertical plane, said seat back having a back frame or base, means connecting the base of said seat back to the upper frame for movement therewith, said means comprising hinged elements, one of said elements being secured to the base of said seat back and the other element being formed of a rod coiled intermediate of its ends to form a hinge eye, one of said ends being connected to the rear cross member of said upper frame and the other end crossing and spanning the rear and front cross members of said upper frame, and means securing one of said ends to the rear cross member of said upper frame, and the other of said ends to both the front and the rear cross members of said upper frame.

4. In a cushion construction having a seat cushion including cushioning means comprising laterally spaced rows of helical upright springs and an upper rectangular frame supported on said springs, a back support, and a seat back supported thereon for guided movement in a substantially vertical plane, said seat back having a back frame or base, means connecting the base of said seat back to the upper frame of said seat cushion for movement therewith, said means comprising hinged elements, one of said elements being secured to the base of said seat back and the other element being formed of a rod coiled into a plurality of convolutions intermediate of its ends to form a hinge eye, one of the end portions of said rod extending under the rear cross member of said upper frame and the other end portion of said rod extending under and spanning the rear and front cross members of said upper frame and bowed downwardly intermediate of its ends below the upper ends of said springs and means securing said end portions respectively to said rear and to rear and front cross members of said upper frame.

5. In a cushion construction having a seat cushion including cushioning means comprising laterally spaced rows of helical upright springs and an upper rectangular frame supported on said springs, a back support, and a seat back supported thereon for guided movement in a substantially vertical plane, said seat back having a back frame or base, means connecting the base of said seat back to the upper frame of said seat cushion for movement therewith, said means comprising hinged elements, one of said elements being secured to the base of said seat back and the other element being formed of a rod coiled into a plurality of convolutions intermediate of its ends to form a hinge eye, one of the end portions of said rod being connected to the rear cross member of said upper frame and the other end portion of said rod crossing and spanning the rear and front cross members of said upper frame and bowed downwardly intermediate of its end below the upper ends of said springs, and means securing said end portions respectively to said rear and to said rear and front cross members of said upper frame.

6. In a cushion construction having a seat cushion including cushioning means comprising laterally spaced rows of helical upright springs and an upper rectangular frame supported on said springs, a back support, and a seat back supported thereon for guided movement in a substantially vertical plane, said seat back having a back frame or base, means connecting the base of said seat back to the upper frame of said seat cushion for movement therewith, said means comprising hinged elements, one of said elements being secured to the base of said seat back and the other element being formed of a rod coiled into a plurality of convolutions intermediate of its ends to form a hinge eye, one of the end portions of said rod being connected to the rear cross member of said upper frame and the other end portion of said rod crossing and spanning the rear and front cross members of said upper frame and offset intermediate of its ends to lie in a plane intermediate of the upper and next adjacent convolutions of the springs and means securing said end portions respectively to said rear and to said rear and front cross members of said upper frame.

7. In a cushion construction comprising a seat cushion including cushioning means and an upper open frame supported by said cushioning means, a back support, a seat back supported thereon for guided movement in a substantially vertical plane, said seat back having a back frame or base, means connecting the base of the seat back to the upper frame of the seat cushion for movement therewith, said means comprising hinged members, one of said hinged members being secured to said base of the seat back and including a horizontally extending pintle and the other hinged member being formed of a rod coiled intermediate of its ends to form a pintle receiving eye extending horizontally, said rod including forwardly extending end portions extending under the rear member of said upper frame and at least one of said portions extending also under the front member of said frame and having its intermediate portion spanning said upper frame, and means securing said end portions respectively to said rear and front members in said upper frame.

8. In a cushion construction adapted to be supported on a fixed base member and a fixed back member, comprising a seat cushion supported directly on said fixed base member and including an upper seating portion supported on cushioning means for movement as a unit in all directions, said cushion construction also comprising a seat back, a tight hinge connection between the rear end of said upper seating portion of said seat cushion and the lower end of said seat back, a sliding pivotal connection between the upper end section of said seat back and said back member, said connection comprising an inclined runway on said back member and rotatable means carried by said seat back and engaging said runway on a single horizontal line, said runway and said seat back being spaced to permit of free pivotal movement of said seat back on said runway, and means connecting said inclined runway to said back member for pivotal movement of said runway with respect to said back member in a plane parallel to said back member.

HOMER C. CARPENTER.